United States Patent [19]

Bresser et al.

[11] 4,394,325

[45] Jul. 19, 1983

[54] ELEMENTAL SULFUR-STABLIZED ORGANIC ANTIMONY COMPOUND COMPOSITION

[75] Inventors: Robert E. Bresser, Sharonville, Ohio; Sidney S. White, Jr., Seminole, Fla.; Arthur F. Koeniger, Cincinnati, Ohio

[73] Assignee: Carstab Corporation, Reading, Ohio

[21] Appl. No.: 325,473

[22] Filed: Nov. 27, 1981

[51] Int. Cl.$^3$ .................... C09K 15/32; C07C 149/00
[52] U.S. Cl. ..................... 260/446; 252/406; 524/80; 524/177; 524/289; 524/301
[58] Field of Search ............... 252/406; 524/80, 177, 524/289, 301; 260/446

[56] References Cited

U.S. PATENT DOCUMENTS

| 2,245,500 | 6/1941 | Rein et al. | 524/80 |
|---|---|---|---|
| 2,680,726 | 6/1954 | Weinberg et al. | 260/30.6 |
| 2,684,956 | 7/1954 | Weinberg et al. | 260/31.8 |
| 3,340,285 | 9/1967 | Remes et al. | 260/446 |
| 3,399,220 | 8/1968 | Remes et al. | 260/446 |
| 3,530,158 | 9/1970 | Leebrick et al. | 260/446 |
| 3,919,168 | 11/1975 | Dieckmann | 524/177 |
| 4,029,618 | 6/1977 | Dieckmann | 524/177 |
| 4,115,352 | 9/1978 | Bohen et al. | 524/177 |
| 4,279,806 | 7/1981 | Muldrow | 524/301 |
| 4,287,118 | 9/1981 | Muldrow | 524/301 |
| 4,336,168 | 6/1982 | Hoch et al. | 524/302 |

FOREIGN PATENT DOCUMENTS 54-151920  11/1979  Japan .

*Primary Examiner*—V. P. Hoke
*Attorney, Agent, or Firm*—Gerald K. White; Richard J. Sheridan

[57] ABSTRACT

Provided are organic antimony compound compositions comprising (a) at least one organic antimony compound having at least one antimony-sulfur-carbon (i.e. Sb-S-C) linkage and as a stabilizer therefor, (b) elemental sulfur. Also provided are stabilized organic polymer compositions comprising a halogen containing polymer and said organic antimony compound-elemental sulfur compositions.

3 Claims, No Drawings

ELEMENTAL SULFUR-STABLIZED ORGANIC ANTIMONY COMPOUND COMPOSITION

FIELD OF THE INVENTION

This invention relates to novel organic antimony stabilizer compositions for stabilizing halogen, particularly chlorine, containing polymers against degradation by light and/or heat. Additionally, this invention relates to halogen, more particularly chlorine containing polymer compositions having incorporated therein a novel organic antimony stabilizer composition and to the method of stabilizing halogen, more particularly chlorine, containing polymers against light and/or heat degradation including the step of combining a novel organic antimony stabilizer composition and a halogen, more especially chlorine, containing polymer.

BACKGROUND OF THE INVENTION

Halogen containing polymers, more especially chlorine, containing polymers and still more especially polyvinyl chloride and copolymers of vinyl chloride, have attained a high degree of commercial significance and use. Polyvinyl chloride (PVC), in particular, is widely used in packaging, siding, pipe and extruded shapes. Such large scale and diverse use of the halogen containing polymers, as exemplified by PVC, is the result, at least in part, of the stabilization of such polymers against degradation caused by light and/or heat. PVC is known to degrade upon prolonged exposure to light and/or heat during processing and use with attendant darkening or change of color and loss of physical properties (e.g. tensile, flexural and impact strengths. Such degradation detracts from the usefulness of PVC and imposes restrictions on the conditions and apparatus for processing and manufacturing PVC articles. Thus, for example, the service life of a PVC article may be significantly limited, the conditions under which the PVC article is used severely restricted and the manufacturing conditions very narrow. To overcome this problem of degradation, various substances have been added to the halogen containing polymer (e.g. PVC). These substances, known as stabilizers, have included materials such as, for example, organic antimony compounds having an antimony-sulfur-carbon linkage in the molecule (e.g. antimony tris isooctylthioglycolate). Organic sulfur compounds such as, for example, thiuram sulfide, dibenzamido-diphenyl sulfide, mercaptopyridine, mercaptobenzamidazole, mercaptobenzathiazole, and thiodipropionic acid have also been added to halogen containing polymers as stabilizers and as costabilizers (i.e. in combination with other stabilizers).

Although a number of organic antimony compounds have been taught in the art as stabilizers for halogen containing polymers (e.g. PVC) they have not received wide spread commercial acceptance because of their somewhat lower effectiveness than other compounds. In particular organic antimony compounds having an antimony-sulfur-carbon linkage (e.g. antimony tris isooctylthioglycolate) have in the past not attained significant commercial use as a stabilizer for halogen containing polymers (e.g. PVC), compared to other stabilizers, because they have, among other things, exhibited storage instability, especially when stored exposed to light and/or moisture. Such instability has been pointed out by D. J. Dieckmann in U.S. Pat. No. 4,029,618 issued June 14, 1977. This instability not only reduces the stabilizing effectiveness of the organic antimony compounds having an antimony-sulfur-carbon linkage but also results in their inconsistent stabilizing performance. Where the organic antimony compound having an antimony-sulfur-carbon linkage is a liquid or is dissolved in a liquid to form a homogeneous mixture, the storage instability, especially upon exposure to light and/or moisture, is manifested by the formation of a precipitate (i.e. insoluble solid). This formation of a precipitate is undesirable.

The organic antimony stabilizer compositions of this invention, which are useful for stabilizing halogen containing organic polymers (e.g. polyvinyl chloride) against degradation caused by heat and/or light during processing and use, are highly resistant to degradation during storage, especially during storage with exposure to light and/or moisture. Thus, the organic antimony stabilizer compositions according to this invention are highly resistant to formation of a precipitate during storage, especially storage with exposure to light and/or moisture.

It is, therefore, an object of this invention to provide an organic antimony stabilizer composition, having improved storage stability, for stabilizing halogen containing polymers. A further object of this invention is to provide a polymer composition resistant to heat and/or light comprising a halogen containing polymer and an organic antimony stabilizer composition having improved storage stability. A still further object of this invention is to provide a method for stabilizing a halogen containing polymer against heat and/or light comprising the step of adding to the halogen containing polymer an organic antimony stabilizer composition having improved storage stability. These and other objects, as will become apparent from the following disclosure, are attained by this invention.

SUMMARY OF THE INVENTION

It has now been found that the foregoing objects and others, as will be apparent from the following description, are achieved by (1) an organic antimony composition comprising (a) an organic antimony compound having at least one antimony-sulfur-carbon linkage and (b) elemental sulfur, (2) a polymer composition comprising a halogen containing polymer and an organic antimony stabilizer composition comprising (a) an organic antimony compound having at least one antimony-sulfur-carbon linkage and (b) elemental sulfur and (3) a method of stabilizing a halogen containing polymer comprising the step of combining a halogen containing polymer and an organic antimony stabilizer composition comprising (a) an organic antimony compound having at least one antimony-sulfur-carbon linkage and (b) elemental sulfur.

DESCRIPTION OF THE INVENTION

In accordance with this invention there is now provided a novel improved, highly stable, particularly hydrolysis and light stable, organic antimony stabilizer composition comprising (a) an organic antimony compound having at least one antimony-sulfur-carbon linkage and (b) elemental sulfur. Further, there is provided in accordance with this invention a halogen containing polymer composition resistant to degradation by heat and/or light comprising (1) a halogen containing organic polymer and (2) an organic antimony stabilizer composition comprising (a) an organic antimony compound having at least one antimony-sulfur-carbon linkage and (b) elemental sulfur. There is also provided in accordance with this invention a method of stabilizing a halogen containing organic polymer against degradation caused by heat and/or light during processing and/or use comprising the step of combining a halogen containing organic polymer and an organic antimony stabilizer composition comprising (a) an organic antimony compound having at least one antimony-sulfur-carbon linkage and (b) elemental sulfur.

This invention in one particular aspect provides an improved, highly stable, particularly hydrolysis and light stable, organic antimony stabilizer composition comprising (a) an organic antimony compound having at least one antimony-sulfur-carbon linkage and having the formula $$(R)_{\overline{3-i}}\text{—Sb}(\text{SR}^1)_i \quad (I)$$

or the formula

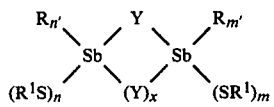     (II)

wherein

R is selected from the group consisting of alkyl, aryl, cycloalkyl, cycloalkenyl, aralkyl, alkaryl, and alkenyl;

$R^1$ is selected from the group consisting of alkyl, aryl, cycloalkyl, cycloalkenyl, aralkyl, alkaryl, alkenyl, $$-(CH_2)_{\overline{z}}-COOR^2 \text{ and } -(CH_2)_{\overline{a}}-OCR^3;$$

$R^2$ is hydrogen, alkyl, aryl, alkenyl, cycloalkyl or alkoxyalkyl;

$R^3$ is alkyl, aryl, cycloalkyl or alkenyl;

Y is selected from the group consisting of

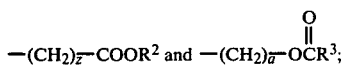

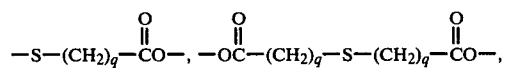

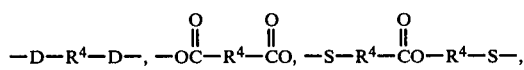

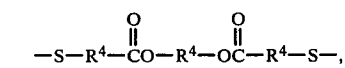

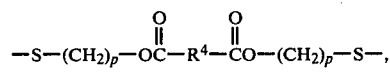

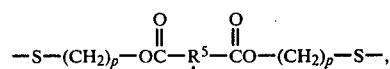

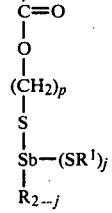

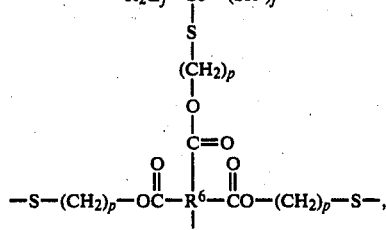

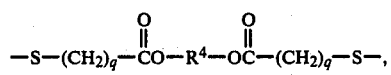

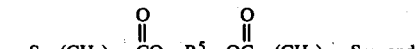

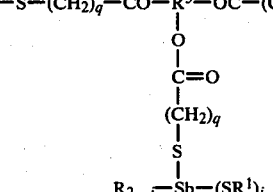

$R^4$ is alkylene, arylene or alkenylene;
$R^5$ is a trivalent alkyl or aryl radical;
$R^6$ is a tetravalent alkyl or aryl radical;
D is oxygen or sulfur;
i=1, 2 or 3;
j=1 or 2;
m=1 or 2 and m'=0 or 1;
n=1 or 2 and n'=0 or 1;
x is 0 or 1 with the proviso that when x=0 then m+m'=2 and n+n'=2, and when x=1 then m=1, m'=0, n=1 and n'=0;
z is 1, 2 or 3;
a is 2, 3 or 4;
q is 1, 2 or 3; and
p is 2, 3 or 4;
and (b) elemental sulfur.

As used herein, the term alkyl represents straight or branched chain, saturated hydrocarbon radicals containing, for example, 1 to 20 carbon atoms, preferably 1 to 8 carbon atoms. The term aryl refers to $C_6$-$C_{10}$ aromatic rings such as benzene and naphthalene, and preferably benzene. The term alkenyl refers to monovalent straight or branched chain $C_2$ to $C_{20}$ hydrocarbon radicals containing one or more carbon-carbon double bonds. The term aralkyl represents a monovalent $C_1$ to $C_{20}$ hydrocarbon radical having attached thereto an aryl radical. The term alkaryl refers to monovalent aryl radicals having attached thereto at least one $C_1$-$C_{20}$ alkyl group. The term cycloakyl represents monovalent $C_3$-$C_8$ saturated cycloaliphatic radicals, preferably cyclohexane, and the term cycloalkenyl represents $C_5$-$C_8$ cycloaliphatic radicals containing at least one carbon-carbon double bond. The term alkylene refers to divalent, straight or branched chain hydrocarbon radicals containing, for example, 1 to 20 carbon atoms. The term arylene refers to divalent $C_6$-$C_{10}$ aromatic rings. The term alkenylene represents divalent, straight or branched chain $C_2$ to $C_{20}$ hydrocarbon radicals containing at least one carbon-carbon double bond. The term alkoxyalkyl represents monovalent, $C_2$ to $C_{20}$ alkoxyalkyl radicals.

The preferred organic antimony compounds of formulae (I) and (II) are those wherein $R^1$ is selected from $C_1$-$C_{18}$ alkyl, phenyl, cyclohexyl,

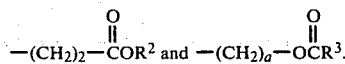

More preferred are those compounds wherein $R^1$ is

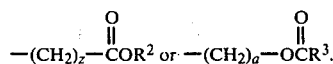

Still more preferred are the compounds wherein $R^1$ is

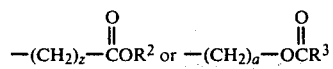

wherein $R^2$ and $R^3$ are $C_1$-$C_{20}$ alkyls or $C_2$-$C_{20}$ alkenyl. In accordance with formula (I), i is 1, 2, or 3, preferably 2 or 3, more preferably 3. Where the organic antimony compound is according to formula (II), m and n are preferably 2, x is preferably 0, q is preferably 1 or 2 and p is preferably 2 or 3.

In a preferred practice of the organic antimony stabilizer composition of this invention there is provided a composition comprising (a) an organic antimony compound having at least one antimony-sulfur-carbon linkage and having the formula

wherein R, $R^1$ and i are as previously defined and (b) elemental sulfur. As a more preferred practice the organic antimony stabilizer composition according to this invention wherein the organic antimony compound is according to formula (I), i has a value of three. Another practice of the organic antimony stabilizer composition according to this invention provides an organic antimony stabilizer composition comprising (a) an organic antimony compound having at least one antimony-sulfur-carbon linkage and having the formula

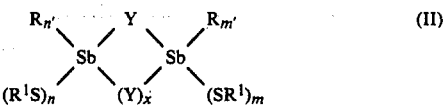

wherein R, $R^1$, Y, m, m', n, n' and x are as previously defined and (b) elemental sulfur. The amount of elemental sulfur present in the organic antimony stabilizer composition of this invention may vary widely, it being only important that at least an amount of elemental sulfur be present which stabilizes the organic antimony compound against light and moisture during storage. There may be used from 0.005% to 2.0%, preferably 0.03% to 0.5% by weight of elemental sulfur based on the weight of the organic antimony compound. More preferably from 0.1% to 0.5% by weight of elemental sulfur, based on the weight of the organic antimony compound, may be used. Desirably the elemental sulfur should be in a dissolved or highly dispersed form in the organic antimony stabilizer composition of this invention.

An organic polymer composition having unexpected improved resistance to heat, comprising a halogen containing organic polymer, preferably a homopolymer or copolymer of a vinyl halide monomer, and an organic antimony stabilizer composition comprising (1) an organic antimony compound having formula (I) or (II) and (2) elemental sulfur is provided in accordance with this invention.

As organic antimony compounds according to formula (I) that may be usable in the practice of the organic antimony stabilizer composition and the organic polymer composition of this invention there include, but are not limited to, compounds wherein R, $R^1$ and i of formula (I) are as shown in Table I.

TABLE I

| R | $R^1$ | i |
|---|---|---|
| — | $-CH_2-\overset{O}{\overset{\|}{C}}OC_8H_{17}$ | 3 |
| — | $-CH_2-\overset{O}{\overset{\|}{C}}O\ CH_3$ | 3 |
| — | $-(CH_2)_2\overset{O}{\overset{\|}{C}}OC_4H_9$ | 3 |
| — | $-CH_2\overset{O}{\overset{\|}{C}}OC_{18}H_{37}$ | 3 |
| — | $-(CH_2)_3\overset{O}{\overset{\|}{C}}OC_6H_{13}$ | 3 |
| — | $-(CH_2)_2OC\overset{O}{\overset{\|}{-}}C_{17}H_{35}$ | 3 |
| — | $-(CH_2)_3OC\overset{O}{\overset{\|}{-}}C_7H_{15}$ | 3 |
| — | $-(CH_2)_2OC\overset{O}{\overset{\|}{-}}C_3H_7$ | 3 |
| $C_4H_9$ | $-(CH_2)_2\overset{O}{\overset{\|}{C}}OC_{12}H_{25}$ | 2 |

TABLE I-continued

| R | R¹ | i |
|---|---|---|
| $C_6H_5$ | $-CH_2\overset{O}{\underset{\|}{C}}C_8H_{17}$ | 2 |
| $C_8H_{17}$ | $-(CH_2)_2\overset{O}{\underset{\|}{C}}CH_3$ | 2 |
| $C_6H_5-CH_2-$ | $-(CH_2)_2O\overset{O}{\underset{\|}{C}}-C_5H_{11}$ | 2 |
| $C_6H_{13}$ | $-(CH_2)_3O\overset{O}{\underset{\|}{C}}-C_{17}H_{33}$ | 2 |
| — | $-C_2H_5$ | 3 |

TABLE I-continued

| R | R¹ | i |
|---|---|---|
| — | $-C_4H_9$ | 3 |
| — | $-C_8H_{17}$ | 3 |
| — | $-C_{12}H_{25}$ | 3 |
| — | $-C_{18}H_{35}$ | 3 |
| $CH_3$ | $-C_8H_{17}$ | 1 |
| $C_8H_{17}$ | $-C_{18}H_{35}$ | 2 |
| — | $-C_6H_5$ | 3 |
| — | $-CH_2-(C_6H_5)$ | 3 |
| $-C_4H_9$ | $-(C_6H_4)CH_3$ | 2 |

Organic antimony compounds according to formula (II) that may be used in the practice of the organic antimony stabilizer composition and the organic polymer composition of this invention include, but are not limited to, compounds wherein R, R¹, Y, m, m', n, n' and x of formula (II) are as shown in Table II.

TABLE II

| n | m | n' | m' | x | R | R¹ | Y |
|---|---|---|---|---|---|---|---|
| 2 | 2 | 0 | 0 | 0 | — | $-C_5H_{11}$ | $-S-C_4H_8-S-$ |
| 2 | 2 | 0 | 0 | 0 | — | $-CH_2COOC_4H_9$ | $-S-C_{12}H_{24}-S-$ |
| 2 | 2 | 0 | 0 | 0 | — | $-(CH_2)_2OOC-C_{17}H_{35}$ | $-S-C_6H_4-S-$ |
| 2 | 2 | 0 | 0 | 0 | — | $-(CH_2)_2COOC_8H_{17}$ | $-S-CH_2\overset{O}{\underset{\|}{C}}OC_2H_4O\overset{O}{\underset{\|}{C}}CH_2-S-$ |
| 2 | 2 | 0 | 0 | 0 | — | $-C_{12}H_{25}$ | $-S-(CH_2)_2\overset{O}{\underset{\|}{C}}O-C_3H_6O\overset{O}{\underset{\|}{C}}(CH_2)_2-S-$ |
| 1 | 1 | 1 | 1 | 0 | $-CH_3$ | $-(CH_2)_3\overset{O}{\underset{\|}{C}}OC_{12}H_{25}$ | $-S-CH_2\overset{O}{\underset{\|}{C}}O-C_6H_4O\overset{O}{\underset{\|}{C}}CH_2-S-$ |
| 1 | 1 | 1 | 1 | 0 | $-C_8H_{17}$ | $-CH_2\overset{O}{\underset{\|}{C}}OC_6H_5$ | $-S-(CH_2)_3\overset{O}{\underset{\|}{C}}O-C_8H_{16}O\overset{O}{\underset{\|}{C}}(CH_2)_3-S-$ |
| 2 | 2 | 0 | 0 | 0 | — | $-S-CH_2\overset{O}{\underset{\|}{C}}OC_8H_{17}$ | $-S-CH_2\overset{O}{\underset{\|}{C}}O-$ |
| 2 | 2 | 0 | 0 | 0 | — | $-S-CH_2\overset{O}{\underset{\|}{C}}OC_{18}H_{37}$ | $-S-(CH_2)_2\overset{O}{\underset{\|}{C}}O-$ |
| 2 | 2 | 0 | 0 | 0 | — | $-S-(CH_2)_2\overset{O}{\underset{\|}{C}}OC_4H_9$ | $-S-(CH_2)_3\overset{O}{\underset{\|}{C}}O-$ |
| 2 | 2 | 0 | 0 | 0 | — | $-S-(CH_2)_3\overset{O}{\underset{\|}{C}}OC_{12}H_{25}$ | $-S-CH_2\overset{O}{\underset{\|}{C}}O-$ |
| 1 | 1 | 0 | 0 | 1 | — | $-S-CH_2\overset{O}{\underset{\|}{C}}OC_6H_5$ | $-S-(CH_2)_2\overset{O}{\underset{\|}{C}}O-$ |
| 2 | 2 | 0 | 0 | 0 | — | $-S-CH_2\overset{O}{\underset{\|}{C}}OCH_2C_6H_5$ | $-S-CH_2\overset{O}{\underset{\|}{C}}O-$ |
| 2 | 2 | 0 | 0 | 0 | — | $-S-CH_2\overset{O}{\underset{\|}{C}}OC_6H_4CH_3$ | $-S-CH_2\overset{O}{\underset{\|}{C}}O-$ |
| 2 | 2 | 0 | 0 | 0 | — | $-C_8H_{17}$ | $-S-(CH_2)_2\overset{O}{\underset{\|}{C}}O-$ |
| 1 | 1 | 1 | 1 | 0 | $-CH_3$ | $-S-CH_2\overset{O}{\underset{\|}{C}}OC_6H_{13}$ | $-S-CH_2\overset{O}{\underset{\|}{C}}O-$ |
| 1 | 1 | 1 | 1 | 0 | $-C_4H_9$ | $-S-(CH_2)_2\overset{O}{\underset{\|}{C}}OC_4H_9$ | $-S-(CH_2)_2\overset{O}{\underset{\|}{C}}O-$ |

TABLE II-continued

| n | m | n' | m' | x | R | R¹ | Y |
|---|---|----|----|---|---|----|---|
| 2 | 2 | 0 | 0 | 0 | — | $-S-(CH_2)_2O\overset{O}{\overset{\|}{C}}-C_{17}H_{35}$ | $-S-CH_2-\overset{O}{\overset{\|}{C}}O-$ |
| 1 | 1 | 1 | 1 | 0 | $-C_8H_{17}$ | $-S-(CH_2)_3O\overset{O}{\overset{\|}{C}}-C_7H_{15}$ | $-S-(CH_2)_3\overset{O}{\overset{\|}{C}}O-$ |
| 2 | 2 | 0 | 0 | 0 | — | $-S-CH_2\overset{O}{\overset{\|}{C}}OC_8H_{17}$ | $-S-C_6H_4-\overset{O}{\overset{\|}{C}}O-$ |
| 2 | 2 | 0 | 0 | 0 | — | $-C_4H_9$ | $-S-(CH_2)_2-O\overset{O}{\overset{\|}{C}}-C_2H_4-\overset{O}{\overset{\|}{C}}O-(CH_2)_2-S-$ |
| 1 | 1 | 1 | 1 | 0 | $-CH_3$ | $-C_8H_{17}$ | $-S-(CH_2)_3O\overset{O}{\overset{\|}{C}}-C_6H_{12}\overset{O}{\overset{\|}{C}}O-(CH_2)_3-S-$ |
| 2 | 2 | 0 | 0 | 0 | — | $-CH_2\overset{O}{\overset{\|}{C}}OC_6H_{13}$ | $-S-(CH_2)_4O\overset{O}{\overset{\|}{C}}-C_2H_2-\overset{O}{\overset{\|}{C}}O-(CH_2)_4-S-$ |
| 1 | 1 | 1 | 1 | 0 | $-C_4H_9$ | $-(CH_2)_2\overset{O}{\overset{\|}{C}}O-C_{18}H_{37}$ | $-S-(CH_2)_3O\overset{O}{\overset{\|}{C}}-C_6H_4-\overset{O}{\overset{\|}{C}}O-(CH_2)_3-S-$ |
| 2 | 2 | 0 | 0 | 0 | — | $-(CH_2)_2O\overset{O}{\overset{\|}{C}}-C_7H_{15}$ | $-S-(CH_2)_2O\overset{O}{\overset{\|}{C}}-C_{12}H_{24}-\overset{O}{\overset{\|}{C}}O-(CH_2)_2-S-$ |
| 1 | 1 | 1 | 1 | 0 | $-C_8H_{17}$ | $-(CH_2)_3O\overset{O}{\overset{\|}{C}}-C_6H_5$ | $-S-(CH_2)_2O\overset{O}{\overset{\|}{C}}-C_{10}H_{18}\overset{O}{\overset{\|}{C}}O-(CH_2)_2-S-$ |
| 1 | 1 | 1 | 1 | 0 | $-C_6H_5$ | $-(CH_2)_3\overset{O}{\overset{\|}{C}}OC_2H_5$ | $-S-(CH_2)_2O\overset{O}{\overset{\|}{C}}-C_4H_8-\overset{O}{\overset{\|}{C}}O-(CH_2)_2-S-$ |
| 1 | 1 | 0 | 0 | 1 | — | $-CH_2\overset{O}{\overset{\|}{C}}O-C_6H_5$ | $-S-(CH_2)_3O\overset{O}{\overset{\|}{C}}-C_3H_6-\overset{O}{\overset{\|}{C}}O(CH_2)_2-S-$ |
| 2 | 2 | 0 | 0 | 0 | — | $-C_{18}H_{37}$ | $-O\overset{O}{\overset{\|}{C}}-(CH_2)_2S-(CH_2)_2\overset{O}{\overset{\|}{C}}O-$ |
| 1 | 1 | 1 | 1 | 0 | $-C_6H_{13}$ | $-C_{10}H_{21}$ | $-O\overset{O}{\overset{\|}{C}}-CH_2-S-CH_2-\overset{O}{\overset{\|}{C}}O-$ |
| 2 | 2 | 0 | 0 | 0 | — | $-CH_2\overset{O}{\overset{\|}{C}}OC_{10}H_{21}$ | $-O\overset{O}{\overset{\|}{C}}-(CH_2)_3-S-(CH_2)_3-\overset{O}{\overset{\|}{C}}O-$ |
| 1 | 1 | 1 | 1 | 0 | $-CH_3$ | $-(CH_2)_2\overset{O}{\overset{\|}{C}}O-C_4H_9$ | $-O\overset{O}{\overset{\|}{C}}-(CH_2)_2-S-(CH_2)_2-\overset{O}{\overset{\|}{C}}O-$ |
| 2 | 2 | 0 | 0 | 0 | — | $-(CH_2)_2O\overset{O}{\overset{\|}{C}}-C_{17}H_{33}$ | $-O\overset{O}{\overset{\|}{C}}-(CH_2)_2-S-(CH_2)_2-\overset{O}{\overset{\|}{C}}O-$ |
| 1 | 1 | 1 | 1 | 0 | ⟨phenyl⟩CH₂ | $-(CH_2)_3O\overset{O}{\overset{\|}{C}}-C_6H_5$ | $-O\overset{O}{\overset{\|}{C}}-CH_2-S-CH_2-\overset{O}{\overset{\|}{C}}O-$ |
| 1 | 1 | 1 | 1 | 0 | $-C_8H_{17}$ | $-C_4H_9$ | $-S-C_6H_{12}-S-$ |
| 1 | 1 | 1 | 1 | 0 | $-CH_3$ | $-CH_2\overset{O}{\overset{\|}{C}}OC_8H_{17}$ | $-S-C_4H_8-S-$ |

A halogen containing polymer composition resistant to heat and light is provided comprising (1) a halogen containing organic polymer and (2) an organic antimony stabilizer composition comprising (a) an organic antimony compound having at least one antimony-sulfur-carbon linkage and the formula $$(R)_{3-i}-Sb-(SR^1)_i \quad (I)$$

or the formula

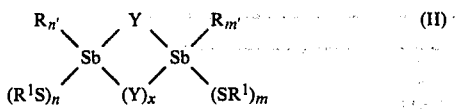

wherein R, R¹, Y, i, m, m', n, n' and x are as previously defined and (b) elemental sulfur.

As one embodiment of the halogen containing polymer composition of this invention, there is provided a halogen containing polymer composition resistant to heat and light comprising (1) a halogen containing organic polymer and (2) an organic antimony stabilizer composition comprising (a) an organic antimony compound according to formula (I) and (b) elemental sulfur. Another embodiment of the halogen containing polymer composition according to this invention is a halogen containing polymer composition resistant to heat and light comprising (1) a halogen containing polymer and (2) an organic antimony stabilizer composition comprising (a) an organic antimony compound according to formula (II) and (b) elemental sulfur. In a preferred practice of the halogen containing polymer composition of this invention, the halogen containing organic polymer is a halogen, more preferably chlorine, containing vinyl homopolymer or copolymer or a halogen, more preferably chlorine, containing homopolymer or copolymer of α-olefin monomers. Homopolymer of vinyl chloride, copolymers of vinyl chloride and a copolymerizable vinyl or olefinic unsaturated monomer, polymer mixtures containing polyvinyl chloride and polymer mixtures containing a copolymer of vinyl chloride and a copolymerizable vinyl or olefinic unsaturated monomer are especially preferred in the practice of the halogen containing polymer composition of this invention.

Representative halogen containing polymers usable in the practice of the halogen containing polymer composition of this invention include but are not limited to (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate and other alkyl methacrylates, methyl alpha chloroacrylate, styrene, vinyl ethers such as vinyl ethyl ether, vinyl chloroethyl ether, vinyl phenyl ether, vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene, and (3) polymer blends such as blends of polyvinyl chloride and polyethylene, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadiene-styrene copolymer, and polyvinyl chloride and polyethylene and polymethyl methacrylate. Typical vinyl halide copolymers usable in this invention include vinyl chloride-vinyl acetate (87:13), vinyl chloride-vinylidene chloride (95:5), vinyl chloride-diethylfumarate (95:5), vinyl chloride-trichloroethylene (95:5) and vinyl chloride-2 ethylhexyl acrylate (80:20). The polymer blends usable in the practice of this invention comprise physical blends of at least two distinct polymeric species and contain from 25 to 95 weight percent of vinyl halide homopolymer. The vinyl halide copolymers usable in the practice of this invention are copolymers comprising from 25 to 95 mole percent vinyl halide units. Chlorinated polyethylene, polymer mixtures containing chlorinated polyethylene and chlorinated copolymers of ethylene and a copolymerizable unsaturated monomer (e.g. propylene, methyl methacrylate, fumaric acid, vinyl acetate and acrylonitrile) may be used in the practice of the halogen containing polymer compositions of this invention.

The amount of the organic antimony stabilizer composition present in the halogen containing polymer compositions of this invention may vary widely, it being only necessary that the organic antimony stabilizer composition be present in the halogen containing polymer composition in a stabilizingly effective amount. Preferably the organic antimony stabilizer composition may be present in an amount of from 0.001% to 2.0%, more preferably 0.05% to 1.0%, by weight based on the weight of the halogen containing polymer and may contain from 0.005% to 2.0%, preferably 0.03% to 0.5%, more preferably 0.1% to 0.5% by weight of sulfur based on the weight of the organic antimony compound.

In addition to the organic antimony stabilizer composition taught herein, there may be added to the halogen containing organic polymer conventional additives such as fillers, pigments, plasticizers, dyes, lubricants, and ultraviolet light stabilizers well-known to the plastic art. Among the fillers, such materials as calcined clays, calcium carbonate, and talcs can be used. Pigments well-known in the art can be used including such materials as titanium dioxide, carbon black and iron oxide. Included among the well-known plasticizers which are usable are phthalates, sebacates, adipates, phosphates and fatty esters having between 16 to 150 carbon atoms. Lubricants well known in the art, which may be used include hydrocarbon waxes, stearyl stearate, cetyl palmitate and other ester waxes. Stabilizers such as well-known ortho hydroxy benzophenones, hydroxy benzotriazoles organotin carboxylates, and organotin mercaptocarboxylic acid esters may be used. Antioxidants include, for example tricresyl phosphite; 2,6-di-t-butyl-4-methyl phenol; 2,6-di-t-butyl-4-decyloxyl phenol and 2-t-butyl-4-octadecyloxy phenol.

Methods well-known in the art for compounding plastic compositions for subsequent processing by techniques such as injection molding, extrusion, calendering and the like may be used for the preparation of the halogen containing polymer composition of this invention. Such methods, for example, include dry blending with conventional mixers such as the well known Henschel blender, blending on a two or three roll mill and tumbling. Blending may be done at room temperature or at temperatures above or below room temperature. The previously prepared organic antimony stabilizer composition can be conveniently added to (i.e. blended into) the halogen containing organic polymer (e.g. PVC) alone or in combination with other additives to be incorporated into the polymer. The organic antimony stabilizer composition of this invention may be prepared by conventional mixing methods, using equipment well known in the art, at room temperature or at temperatures above or below room temperature and optionally in the presence of an inert organic liquid medium (e.g. hydrocarbon solvent). Where an inert organic medium is employed such medium is to be chemically non-reactive with the organic antimony compound and the elemental sulfur.

In accordance with a preferred embodiment of the halogen containing polymer composition of this invention, there is provided a halogen containing polymer composition comprising (1) polyvinyl chloride and (2) an organic antimony stabilizer composition comprising (a) an antimony tris(alkyl mercaptoalkanoate) and (b) elemental sulfur. As a preferred embodiment of the organic antimony stabilizer composition of this invention, there is provided an organic antimony stabilizer composition comprising (a) an antimony tris(alkyl mercaptoalkanoate) and (b) elemental sulfur.

The following examples are presented to further describe the invention and the practice thereof and are not intended to be limiting on the invention or its practice. In the following examples all amounts, ratios and percentages are by weight and temperature in degrees centigrade unless otherwise indicated.

The organic antimony compounds useful in the practice of this invention may be prepared by techniques well known in the art. The following example is illustrative of the manner in which the organic antimony compounds may be prepared.

EXAMPLE A

This example illustrates the preparation of phenylantimony di(isooctylthioglycolate) according to the following reaction scheme:

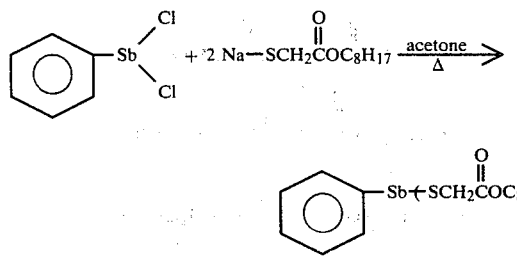

Dichlorophenylstibine (67.5 g, 0.250 mole), prepared by the reaction of phenylmagnesium bromide with antimony trichloride (see *J. Pharm. Belg.*, 19, 133–269 (1937)), and acetone (200 ml) are added to a one liter, 2 neck round bottom flask equipped with a mechanical stirrer and a 350 ml pressure equalizing addition funnel. The resulting solution is stirred and cooled at 10° C. A mixture of sodium isooctylthioglycolate (59.4 g, 0.263 mole) and acetone (250 ml) is prepared and added to the flask over a one hour period. At the completion of this addition, the flask is equipped for heating and condensation and the resulting reaction mixture is refluxed for four hours. The resulting solution is then transferred to a one liter, single neck round bottom flask and the majority of the acetone is removed at reduced pressure (rotary evaporation) leaving a warm residue. This residue is triturated with two 200 ml portions of toluene, and the combined toluene extracts are filtered. The toluene is removed from the filtrate by evaporation under reduced pressure. Analysis indicates the remaining liquid product to be phenylantimony di(isooctylthioglycolate) which is obtained in a typical yield of 141 g or 93.2% of theoretical yield.

LIGHT STABILITY TEST PROCEDURE

In the light stability test a closed clear glass vial containing 0.5 grams of the test composition is stored at room temperature and exposed to room light. Failure of the test composition occurs when there is observed haze formation and/or darkening and/or precipitation. The hours to failure are noted and recorded.

HYDROLYTIC STABILITY TEST PROCEDURE

An open clear glass vial containing 0.5 grams of the test composition is stored at room temperature in the dark in a closed desiccator containing water. A closed clear glass vial containing 0.5 grams of the same test composition is also stored in the same closed desiccator containing water, for comparison purposes. Failure of the test composition occurs when haze formation and/or precipitation is observed. The hours to failure are noted and recorded.

| Example No. | Test Composition | Light Stability (hrs) | Hydrolytic Stability (hrs) |
| --- | --- | --- | --- |
| 1 | antimony tris(isooctylthioglycolate) | 17 | 24 |
| 2 | antimony tris(isooctylthioglycolate) and 0.15%* elemental sulfur | 456 | 400 |
| 3 | antimony tris(isooctylthioglycolate) 0.03%* elemental sulfur | 90 | 180 |
| 4 | antimony tris(isooctylthioglycolate) and 0.5%* elemental sulfur | 400 | 310 |
| 5 | antimony tris(isooctylthiopropionate) and 0.15%* elemental sulfur | 280 | 350 |
| 6 | antimony tris(stearyl thioglycolate) and 0.15%* elemental sulfur | 270 | 260 |
| 7 | antimony tris(methyl thioglycolate) and 0.15%* elemental sulfur | 280 | 290 |
| 8 | antimony tris(2-mercaptoethyl oleate) and 0.15%* elemental sulfur | 180 | 100 |
| 9 | antimony tris(dodecyl mercaptide) and 0.15%* elemental sulfur | 290 | 280 |
| 10 | antimony tris(2-benzothiazole mercaptide) and 0.15%* elemental sulfur | 200 | 160 |
| 11 | pentaerythritol tetra[bis(isooctylthioglycolate)stibino-2-thioacetate] and 0.15%* elemental sulfur | 300 | 290 |
| 12 | ethylene-1,2-bis[di(isooctylthioglycolate)stibino-2-thioacetate] and 0.15%* elemental sulfur | 200 | 180 |
| 13 | antimony tris(isooctylthiopropionate) | 35 | 20 |
| 14 | antimony tris(dodecyl mercaptide) | 48 | 30 |
| 15 | ethylene-1,2,-bis[di(isooctylthioglycolate)stibino-2-thioacetate] | 30 | 18 |
| 16 | pentaerythritol tetra[bis(isooctylthioglycolate)stibino-2-thioacetate] | 80 | 35 |
| 17 | antimony tris(stearyl thioglycolate) | 20 | 40 |
| 18 | antimony tris(methyl thioglycolate) | 15 | 18 |

*% by weight based on the weight of the antimony compound

In a like manner increased resistance to light and hydrolysis is observed when 0.15% elemental sulfur, based on the weight of the antimony compound, is added to
antimony tris(phenyl mercaptide)

antimony tris(benzyl mercaptide)
antimony tris(4-mercaptobutanoic acid)
methyl antimony bis(benzyl thioglycolate)
dibutyl antimony mono(cyclohexyl-3-mercaptopropionate)
antimony tris(2-mercaptoethyl hexanoate)
ethylene 1,2-bis[thio antimony di(butyl thioglycolate)]
bis[antimony di(isooctyl thioglycolate)2-mercapto ethyl]succinate

DYNAMIC MILL TEST

The following formulation was processed on a 2 roll mill at a roll temperature of 193° C. and roll speeds of 30 revolutions per minute (RPM) for the front roll and 40 RPM for the rear roll. Samples were removed from the rolls at one minute intervals for appearance and color evaluation.

| Material | Parts by weight |
|---|---|
| Geon ® 103EP[1] | 100 |
| Omya ® 90T[2] | 3.0 |
| Titanium dioxide | 1.0 |
| Calcium stearate | 0.6 |
| Advawax ® 165[3] paraffin wax | 1.2 |
| AC 629A[4] | 0.15 |
| Stabilizer (as indicated) | 0.35 |

[1] polyvinyl chloride obtained from the Goodrich Chemical Company
[2] fine particle CaCO$_3$ coated with calcium stearate
[3] commercially available from Carstab Corporation
[4] an oxidized low molecular weight ethylene homopolymer obtainable from the Allied Chemical Corp.

The results obtained in the dynamic mill test, conducted in accordance with the above description are shown in the following table.

| Example No. | Stabilizer | Color Rating** at 1" | 2" | 3" | 4" | 5" | 6" | 7" |
|---|---|---|---|---|---|---|---|---|
| 19 | None | 8 | 6 | 4 | 3 | 3 | 3 | 2 |
| 20 | antimony tris(isooctyl-thioglycolate) | 10 | 10 | 10 | 9 | 8 | 7 | 5 |
| 21 | antimony tris(isooctyl-thioglycolate) and 0.15%* elemental sulfur | 10 | 10 | 10 | 9 | 8 | 7 | 5 |
| 22 | antimony tris(isooctyl-thioglycolate) and 0.03%* elemental sulfur | 10 | 9 | 8 | 6 | 6 | 5 | |
| 23 | antimony tris(isooctyl-thioglycolate) and 0.5%* elemental sulfur | 10 | 10 | 10 | 9 | 8 | 7 | |
| 24 | antimony tris(isooctyl mercaptopropionate) and 0.15%* elemental sulfur | 10 | 10 | 9 | 8 | 7 | 6 | |
| 25 | antimony tris(stearyl thioglycolate) and 0.15%* elemental sulfur | 10 | 10 | 9 | 7 | 6 | 5 | 5 |
| 26 | antimony tris(methyl thioglycolate) and 0.15%* elemental sulfur | 10 | 10 | 9 | 7 | 6 | 5 | 5 |

*% by weight based on the weight of the antimony compound.
**10 = white; 9 = trace yellow; 7 = slight yellow; 5 = yellow; 3 = brown; 1 = black.

What we claim and desire to protect by Letters Patent is:

1. A composition comprising
A. at least one organic antimony compound containing at least one antimony to sulfur to carbon linkage and being selected from compounds having the formulas:

or the formula

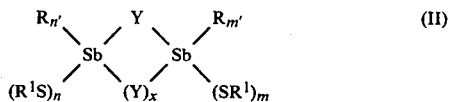

wherein

R is selected from the group consisting of alkyl, aryl, cycloalkyl, cycloalkenyl, aralkyl, alkaryl, and alkenyl;

R$^1$ is selected from the group consisting of alkyl, aryl, cycloalkyl, cycloalkenyl, aralkyl, alkaryl, alkenyl, $$-(CH_2)_{\overline{z}}-COOR^2 \text{ and } -(CH_2)_{\overline{a}}-OCR^3;$$

R$^2$ is hydrogen, alkyl, aryl, alkenyl, cycloalkyl or alkoxyalkyl;
R$^3$ is alkyl, aryl, cycloalkyl or alkenyl;
Y is selected from the group consisting of

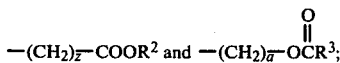

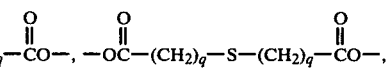

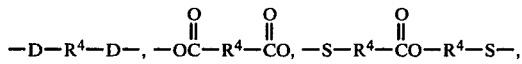

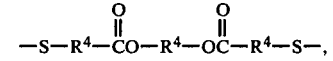

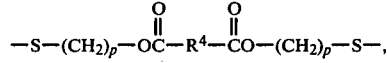

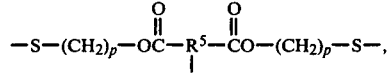

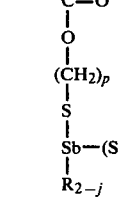

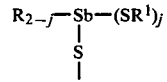

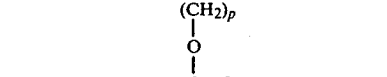

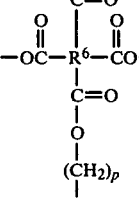

-continued

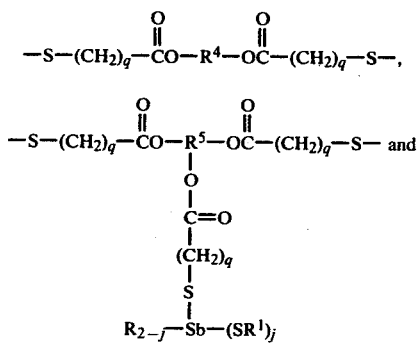

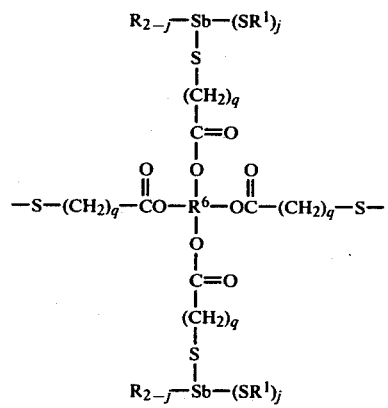

$R^4$ is alkylene, arylene or alkenylene;
$R^5$ is a trivalent alkyl or aryl radical;
$R^6$ is a tetravelent alkyl or aryl radical;

D is oxygen or sulfur;
i=1, 2 or 3;
j=1 or 2;
m=1 or 2 and m'=0 or 1;
n=1 or 2 and n'=0 or 1;
x is 0 or 1 with the proviso that when x=0 then m+m'=2 and n+n'=2, and when x=1 then m=1, m'=0, n=1 and n'=0;
z is 1, 2 or 3;
a is 2, 3 or 4;
q is 1, 2 or 3; and
p is 2, 3 or 4;

B. elemental sulfur in an amount from about 0.005% to about 2.0% by weight based on the weight of the organic antimony compound.

2. The composition of claim 1 wherein the organic antimony compound is a compound according to formulas (I) or (II) wherein $R^1$ is selected from $C_1$ to $C_{18}$ alkyl, phenyl, cyclohexyl,

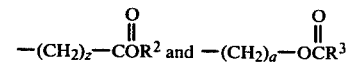

and i=2 or 3, m=2, n=2, x=0, q=1 or 2 and p=2 or 3.

3. The composition of claim 1 wherein the organic antimony compound is a compound according to formula (I) wherein $R^1$ is

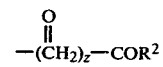

and i=3.

* * * * *